US012323919B2

(12) United States Patent
Tsai et al.

(10) Patent No.: US 12,323,919 B2
(45) Date of Patent: *Jun. 3, 2025

(54) METHOD OF PHYSICAL DOWNLINK CONTROL CHANNEL MONITORING AND RELATED DEVICE

(71) Applicant: Hannibal IP LLC, Frisco, TX (US)

(72) Inventors: Hsin-Hsi Tsai, Taipei (TW);
Chia-Hung Wei, Hsinchu (TW);
Chie-Ming Chou, Hsinchu (TW)

(73) Assignee: Hannibal IP LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/511,142

(22) Filed: Nov. 16, 2023

(65) Prior Publication Data

US 2024/0172122 A1 May 23, 2024

Related U.S. Application Data

(63) Continuation of application No. 17/743,024, filed on May 12, 2022, now Pat. No. 11,871,351, which is a
(Continued)

(51) Int. Cl.
*H04W 52/02* (2009.01)
*H04W 72/23* (2023.01)

(52) U.S. Cl.
CPC ... *H04W 52/0235* (2013.01); *H04W 52/0216* (2013.01); *H04W 72/23* (2023.01)

(58) Field of Classification Search
CPC ......... H04W 52/0235; H04W 52/0216; H04W 72/042; H04W 76/28; H04W 72/23;
(Continued)

(56) References Cited

U.S. PATENT DOCUMENTS 11,368,911 B2 6/2022 Tsai
11,871,351 B2 1/2024 Tsai et al.
(Continued)

FOREIGN PATENT DOCUMENTS

CN 102612119 7/2012
CN 108012314 5/2018
(Continued)

OTHER PUBLICATIONS

3GPP TSG-RAN WG1 #96bis; R1-1905031, Xi'an, China, Apr. 8-12, 2019; Source: Qualcomm Incorporate, Title: PDCCH-based power saving channel (Year: 2019).*
(Continued)

*Primary Examiner* — Mohammed S Chowdhury
(74) *Attorney, Agent, or Firm* — Cole Schotz P.C.; Marcella M. Bodner

(57) ABSTRACT

A method for a UE to monitor a PDCCH comprises receiving a first configuration from a base station to configure the UE with a first search space of the PDCCH, where the first search space is used for monitoring a scheduling signal used for indicating scheduling information, receiving a second configuration from the base station to configure the UE with a second search space of the PDCCH, wherein the second search space is used for monitoring a power saving signal used for indicating wake-up information associated with a DRX functionality, monitoring the first search space in response to the UE being in a DRX active time of the DRX functionality, wherein the DRX active time is a time during which the UE monitors the PDCCH, and not monitoring the second search space in response to the UE being in the DRX active time of the DRX functionality.

18 Claims, 8 Drawing Sheets

Related U.S. Application Data continuation of application No. 16/859,945, filed on Apr. 27, 2020, now Pat. No. 11,368,911.

(60) Provisional application No. 62/840,451, filed on Apr. 30, 2019.

(58) Field of Classification Search
CPC ............. H04W 74/0833; H04L 5/0053; H04L 5/0094; Y02D 30/70
See application file for complete search history.

(56) References Cited

U.S. PATENT DOCUMENTS

| | | | |
|---|---|---|---|
| 2018/0124701 A1 | 5/2018 | Jhang et al. | |
| 2018/0145800 A1 | 5/2018 | Srivastav | |
| 2018/0270756 A1 | 9/2018 | Bhattad et al. | |
| 2018/0332533 A1 | 11/2018 | Bhattad et al. | |
| 2019/0190582 A1* | 6/2019 | Guo | H04L 27/2607 |
| 2019/0254110 A1* | 8/2019 | He | H04W 76/28 |
| 2019/0297577 A1 | 9/2019 | Lin | |
| 2020/0037396 A1 | 1/2020 | Islam | |
| 2020/0092814 A1 | 3/2020 | Zhou | |
| 2020/0112917 A1* | 4/2020 | Nam | H04W 72/23 |
| 2020/0145921 A1 | 5/2020 | Zhang et al. | |
| 2020/0154356 A1 | 5/2020 | Bhattad et al. | |
| 2020/0229092 A1* | 7/2020 | Wu | H04W 52/028 |
| 2020/0351784 A1 | 11/2020 | Tsai et al. | |
| 2021/0022202 A1* | 1/2021 | Kim | H04W 76/27 |
| 2022/0346018 A1 | 10/2022 | Tsai et al. | |

FOREIGN PATENT DOCUMENTS

| | | |
|---|---|---|
| CN | 109155931 | 1/2019 |
| CN | 114051764 | 2/2022 |
| CN | 114051764 B | 5/2024 |
| CN | 118337349 A | 7/2024 |
| CN | 118337350 A | 7/2024 |
| EP | 3964019 | 3/2022 |
| IN | 202147055079 | 12/2021 |
| TW | 201842801 | 12/2018 |
| TW | 201902264 | 1/2019 |
| TW | 202046780 | 12/2020 |
| WO | 2019032882 | 2/2019 |
| WO | 2020060890 | 3/2020 |
| WO | 2020221269 | 11/2020 |

OTHER PUBLICATIONS

English translation of Electronic Filing Receipt for Chinese Patent Application No. 100005244605486, filed on May 8, 2024.
English translation of Transmittal for Chinese Patent Application No. 100005244605486, filed on May 8, 2024.
Electronic Filing Receipt for Chinese Patent Application No. 100005244605486, filed on May 8, 2024.
Transmittal for Chinese Patent Application No. 100005244605486, filed on May 8, 2024.
Chinese Patent Application No. 100005244605486, filed on May 8, 2024.
English translation of Electronic Filing Receipt for Chinese Patent Application No. 100004414718, filed on May 8, 2024.
English translation of Transmittal for Chinese Patent Application No. 100004414718, filed on May 8, 2024.
Electronic Filing Receipt for Chinese Patent Application No. 100004414718, filed on May 8, 2024.
Transmittal for Chinese Patent Application No. 100004414718, filed on May 8, 2024.
Chinese Patent Application No. 100004414718, filed on May 8, 2024.
Notice of Allowance issued on Mar. 11, 2024 for corresponding Chinese Patent Application No. 2020800320287.
English translation of Notice of Allowance issued on Mar. 11, 2024 for corresponding Chinese Patent Application No. 2020800320287.
3GPP TSG RAN WG1 #96bis; R1-1905368, Source: CATT, Title: PDCCH based power saving signal/channel design; Xi'an, China, Apr. 8-12, 2019 (Year: 2019).
3GPP TSG RAN WG1 #96bis; R1-1905371, Source: CATT, Title: PDCCH skipping and switching of PDCCH monitoring periodicity; Xi'an, China, Apr. 8-12, 2019. (Year: 2019).
3GPP TSG RAN WG1 Meeting #96bis; R1-1903988, Source: Huawei, HiSilicon; Title: PDCCH based power saving signal/ channel, Xi'an, China, Apr. 8-12, 2019. (Year: 2019).
3GPP TSG RAN WG1 Rani Meeting #96bis; R1-1904461, Source: Samsung; Title: On PDCCH-based power saving signal/ channel, Xi'an, China, Apr. 8-12, 2019. (Year: 2019).
3GPP TSG-RAN WG1 #96bis, R1-1905031, Xi'an, China, Apr. 8-12, 2019, 7.2.9.1, Qualcomm Incorporated, PDCCH-based power saving channel design, Discussion/Decision.
5G, 3GPP TS 38.212 V16.1.0, 2020, 3rd Generation Partnership Project; Technical Specification Group Radio Access Network; NR; Multiplexing and Channel Coding (Release 16).
5G, 3GPP TS 38.213 V16.1.0, 2020, 3rd Generation Partnership Project; Technical Specification Group Radio Access Network; NR; Physical layer procedures for control (Release 16).
5G, 3GPP TS 38.321 V16.0.0, 2020, 3rd Generation Partnership Project; Technical Specification Group Radio Access Network; NR; Medium Access Control (MAC) protocol specification (Release 16).
5G. 3GPP TS 39.331 V16.0.0, 2020, 3rd Generation Partnership Project; Technical Specification Group Radio Access Network; NR; Radio Resource Control (RRC) protocol specification (Release 16).
Extended European Search Report issued on Dec. 15, 2022 for corresponding European Patent Application No. 20799417.9.
First Office Action issued on Nov. 1, 2023 for corresponding Chinese Application No. 202080032087.
International Preliminary Report on Patentability issued on Nov. 2, 2021, for International Patent Application No. JCT/CN2020/087653.
Interdigital et al., "On power saving techniques", 3GPP Draft; R1-1900813, Power Saving Techniques_Final, 3rd Generation Partnership Project (3GPP), 2019, vol. RAN, WG1, No. Taipei, Taiwan; Jan. 21-Jan. 25, 2019, pp. 4-5.
International Search Report issued on Nov. 5, 2022, for International Patent Application No. PCT/3N2020/087653.
Issue Notification issued on Jun. 1, 2022 for U.S. Appl. No. 16/859,945.
Non-Final Office Action issued on Oct. 15, 2021 for U.S. Appl. No. 16/859,945.
Notice of Allowance issued on Feb. 18, 2022 for U.S. Appl. No. 16/859,945.
Qualcomm Incorporated, "Advanced Grant Indication for UE Power Saving", 3GPP TSG RAN WG1 NR AdHoc#3, R1-1716418, Sep. 21, 2017(Sep. 21, 2017), the whole document.
Qualcomm Incorporated, "UE power saving for PDCCH monitoring", 3GPP TSG RAN WG1 #87, R1-1612065, 18 gov.2016(Nov. 18, 2016), the whole document.
Qualcomm Incorporated: "PCCCH-based power saving channel design" 3GP Draft; R1-1905031, 3rd Generation Partnership Project (3GPP), XP051707367, Section 2.2.2.1, 2.2.2.3, 2.3, 2.3.2, 2.3.3.2 pp. 1-13.
Search Report issued on Nov. 1, 2023, for corresponding Chinese Application No. 202080032087.
Written Opinion of the International Searching Authority issued on Jul. 20, 2020 for International Patent Application PCT/CN2020/087653.
Non-Final Office Action issued on Feb. 22, 2023 for corresponding U.S. Appl. No. 17/743,024.
3GPP TSG-RAN WG1 #96bis, R1-1905031, Xi'an, China, Apr. 8-12, 2019, 7.2.9.1, Qualcomm Incorporated, PDCCG-based power saving channel design, Discussion/Decision.
Notice of Allowance issued on Jun. 26, 2023 for corresponding U.S. Appl. No. 17/743,024.
Notice of Allowance issued on Sep. 20, 2023 for corresponding U.S. Appl. No. 17/743,024.
First Examination Report issued on Feb. 14, 2024 by the Indian Patent Office for corresponding Indian Patent Application No. 202147055079.

(56) References Cited

OTHER PUBLICATIONS

English translation of Notice of Publication of Chinese Publication No. 118337349 issued on Jul. 12, 2024 for Chinese Application No. 202410561574.
Notice of Publication of Chinese Publication No. 118337349 issued on Jul. 12, 2024 for Chinese Application No. 202410561574.
English translation of Notice of Publication of Chinese Publication No. 118337350 issued on Jul. 12, 2024 for Chinese Application No. 202410561850.
Notice of Publication of Chinese Publication No. 118337350 issued on Jul. 12, 2024 for Chinese Application No. 202410561850.

* cited by examiner

METHOD OF PHYSICAL DOWNLINK CONTROL CHANNEL MONITORING AND RELATED DEVICE

CROSS-REFERENCE TO RELATED APPLICATION(S)

The present application is a continuation of U.S. patent application Ser. No. 17/743,024, filed on May 12, 2022 (now allowed), which is a continuation of U.S. patent application Ser. No. 16/859,945, filed on Apr. 27, 2020 (now U.S. Pat. No. 11,368,911), which claims the benefit of and priority to U.S. provisional Patent Application Ser. No. 62/840,451 filed on Apr. 30, 2019, entitled "Method and Apparatus of Wake Up Signal Monitoring in a Wireless Communication System," (hereinafter referred to as "the '451 provisional"). The disclosure of the '451 provisional is hereby incorporated fully by reference into the present disclosure.

FIELD

The present disclosure generally relates to wireless communications, and more particularly, to a method of physical downlink control channel (PDCCH) monitoring and a related device.

BACKGROUND

3GPP provides a new study item on a user equipment (UE) power saving in new radio (NR). UE battery life is an important aspect of the user's experience, which will influence the adoption of 5G handsets and/or services. It is critical to study UE power consumption for Rel-16 to ensure that UE power efficiency for 5G NR use can be at least as good as long term evolution (LTE), and techniques and designs for improvements are identified and adopted.

Because a NR system may be capable of supporting high speed data transport, it is expected that user data tends to be bursty and provided in very short durations. One efficient UE power saving mechanism is to trigger the UE for network access from a power efficient mode. UE would stay in the power efficient mode, such as micro sleep or OFF period in the long Discontinuous Reception (DRX) cycle, unless it is informed of network access through a UE power saving framework. Alternatively, the network can assist the UE to switch from the "network access" mode to the "power efficient" mode when there is no traffic to deliver, e.g., dynamic UE transition to sleep with network assistance signal.

In addition to minimizing the power consumption with the new wake-up/go-to-sleep mechanism, it is equally important to reduce the power consumption during the network access in radio resource control (RRC)_CONNECTED mode. More than half of the power consumption in LTE is with the UE in the access mode. The power saving scheme should focus on minimizing the dominate factor of power consumption during the network access, which includes the processing of aggregated bandwidth, active RF chain number and active reception/transmission time, and dynamic transition to power efficient mode. Since the majority cases of LTE field transmission time intervals (TTIs) are with no data or small amounts of data, the power saving scheme for the dynamic adaptation to the different data arrivals should be studied in RRC_CONNECTED mode. Dynamic adaptation to traffic in different dimensions, such as carrier, antenna, beamforming, and bandwidth, can also be studied for Rel-16. Furthermore, methods to enhance the transitions between "network access" mode and power saving mode should be considered. Both network-assisted and UE-assisted approaches should be considered for UE power saving mechanism.

The study of UE power saving in NR includes the study of the power saving schemes and the associated procedures. The study of power saving schemes is related to UE adaptation to the traffic and UE power consumption characteristics in frequency, time, antenna domains, discontinuous reception (DRX) configuration, and a UE processing timeline for UE power saving. The power saving signal/channel/procedure is used for triggering adaptation of UE power consumption characteristics. The further study of the power saving signal/channel in triggering UE adaptation to DRX operation is related to the configuration of the power saving signal/channel according to the DRX configuration as the indication for the UE to wake up from the sleep state. The further study of the power saving signal/channel candidate in triggering the UE to achieve reduction in PDCCH monitoring is related to using the power saving signal/channel to trigger UE to skip PDCCH monitoring and/or to go to sleep for a period of time. For the adaptation to achieve reduction in PDCCH monitoring/decoding, The UE power consumption can be reduced when the number of UE PDCCH monitoring occasions and/or the number of PDCCH blind decodings is reduced.

DRX operation is introduced as conventional UE power saving. DRX operation governs PDCCH monitoring activity of the UE in RRC_CONECTED mode. When DRX is configured, the UE does not have to continuously monitor PDCCH, so power consumption is reduced. FIG. 1 is a schematic diagram illustrating a DRX operation according to the related art. DRX operation is characterized by the following:

- on-duration: duration that the UE waits after waking up, to receive PDCCHs. If the UE successfully decodes a PDCCH, the UE stays awake and starts the inactivity timer;
- inactivity-timer: duration that the UE waits to successfully decode a PDCCH, from the last successful decoding of a PDCCH, and failing to successfully decode the PDCCH, can go back to sleep. The UE shall restart the inactivity timer following a single successful decoding of a PDCCH for a first transmission only (i.e., not for retransmissions);
- retransmission-timer: duration until a retransmission can be expected;
- DRX cycle: specifies the periodic repetition of the on-duration followed by a possible period of inactivity;
- active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Specifically, a wake-up or a sleep state of the UE could be controlled by DRX mechanism (e.g., DRX Cycle, drx-onDurationTimer, drx-Inactivity Timer, drx-StartOffset, etc.). When the UE stays in the wake-up state (e.g., when the UE is in DRX active time), the UE may ramp up power to monitor the PDCCH continuously. On the contrary, when the UE is in sleep state (e.g., when the UE is not in active time), the UE may not need to monitor the PDCCH.

However, the current DRX mechanism still suffers from some drawbacks. For instance, the running drx-Inactivity Timer may keep the UE awake even without PDCCH scheduling, or whether or not there is PDCCH scheduling, the drx-onDurationTimer may still periodically trigger the UE to wake up. This situation may be called PDCCH-only monitoring (i.e., the UE keeps monitoring the PDCCH but no PDSCH/PUSCH is scheduled for the UE), which causes unnecessary power consumption in RRC connected mode. Therefore, in order to address the shortcoming of current DRX mechanism and save power for the UE, a power saving signal, namely wake-up signaling (WUS), is introduced.

FIG. 2 is a schematic diagram illustrating a WUS mechanism, in accordance with related art. The upper part represents a timeline for the WUS occasion and DRX operation (e.g., DRX cycle and DRX on duration time), and the lower part represents a level of a UE power consumption. The WUS occasion, which may be a time or frequency resource for WUS monitoring, may be pre-configured, by a generation node B (gNB), an offset before the on-duration time. For example, the UE may increase the power to monitor a WUS on a WUS occasion. If the UE receives the WUS signal on the WUS occasion, the UE may spend a time to decode the WUS signal, and then wake up to monitor the PDCCH on the upcoming (or next) on-duration time of the DRX cycle. On the other hand, if the UE does not receive the WUS signal on the WUS occasion, the UE could switch to the sleep state, namely not wake up to monitor the PDDCH for a period (until the next WUS occasion or on-duration time).

The WUS occasion may be indicated by a control resource set (CORESET) or search space configuration. For example, the CORESET or search space configuration of the WUS could be configured along with the DRX configuration. In addition, as shown in FIG. 3, the CORESET or search space may be a specific CORESET or search space for the purpose of WUS monitoring (e.g., time and/or frequency resource for monitoring the WUS).

It is possible that the time domain of the CORESET (or search space) for the WUS may collide with the CORESET (or search space) for scheduling by the PDCCH, as shown in FIG. 3. For example, in FIG. 4, when the UE receives a scheduling PDCCH in the on duration of the DRX cycle, the UE may start or restart a DRX inactivity timer (e.g., drxInactivity Timer). When the DRX inactivity timer is running, the UE may keep monitoring the PDCCH (i.e., the UE stays in DRX active-time). However, if the active time of the UE overlaps with the on duration of the next DRX cycle (e.g., if an amount of time of the DRX inactivity timer is longer than the DRX cycle), the UE may keep monitoring the PDCCH for possible scheduling until the DRX inactivity timer expires. In this case, the UE may need to monitor the PDCCH for scheduling as well as the WUS occasion simultaneously, which increases power consumption of the UE.

SUMMARY

According to an aspect of the present disclosure, a method for a user equipment (UE) monitoring a physical downlink control channel (PDCCH) is disclosed. The method comprises receiving a first configuration from a base station to configure the UE with a first search space of the PDCCH, wherein the first search space is used for monitoring a scheduling signal used for indicating scheduling information, receiving a second configuration from the base station to configure the UE with a second search space of the PDCCH, wherein the second search space is used for monitoring a power saving signal used for indicating wake-up information associated with a Discontinuous Reception (DRX) functionality, monitoring the first search space in response to the UE being in a DRX active time of the DRX functionality, wherein the DRX active time is a time during which the UE monitors the PDCCH, and not monitoring the second search space in response to the UE being in the DRX active time of the DRX functionality.

According to an aspect of the present disclosure, a user equipment (UE) monitoring a physical downlink (DL) control channel (PDCCH) in a wireless communication system is disclosed. The UE comprises a processor, for executing computer-executable instructions, and a non-transitory machine-readable medium, coupled to the processor, for storing the computer-executable instructions, wherein the computer-executable instructions instruct the processor to receive a first configuration from a base station to configure the UE with a first search space of the PDCCH, wherein the first search space is used for monitoring a scheduling signal used for indicating a scheduling information, receive a second configuration from the base station to configure the UE with a second search space of the PDCCH, wherein the second search space is used for monitoring a power saving signal used for indicating wake-up information associated with a Discontinuous Reception (DRX) functionality, monitor the first search space in response to the UE being in a DRX active time of the DRX functionality, wherein the DRX active time is a time during which the UE monitors the PDCCH, and not monitoring the second search space in response to the UE being in the DRX active time of the DRX functionality.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
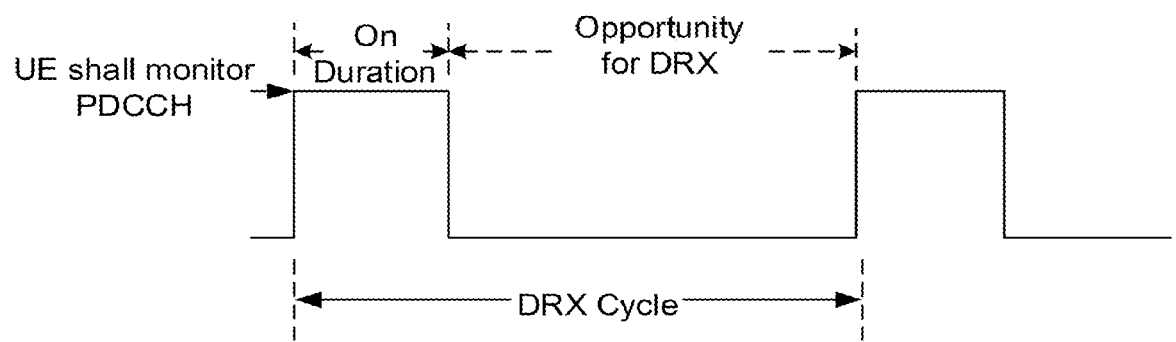
FIG. 1 is a schematic diagram illustrating a DRX cycle, in accordance with related art methods.
Figure 2:
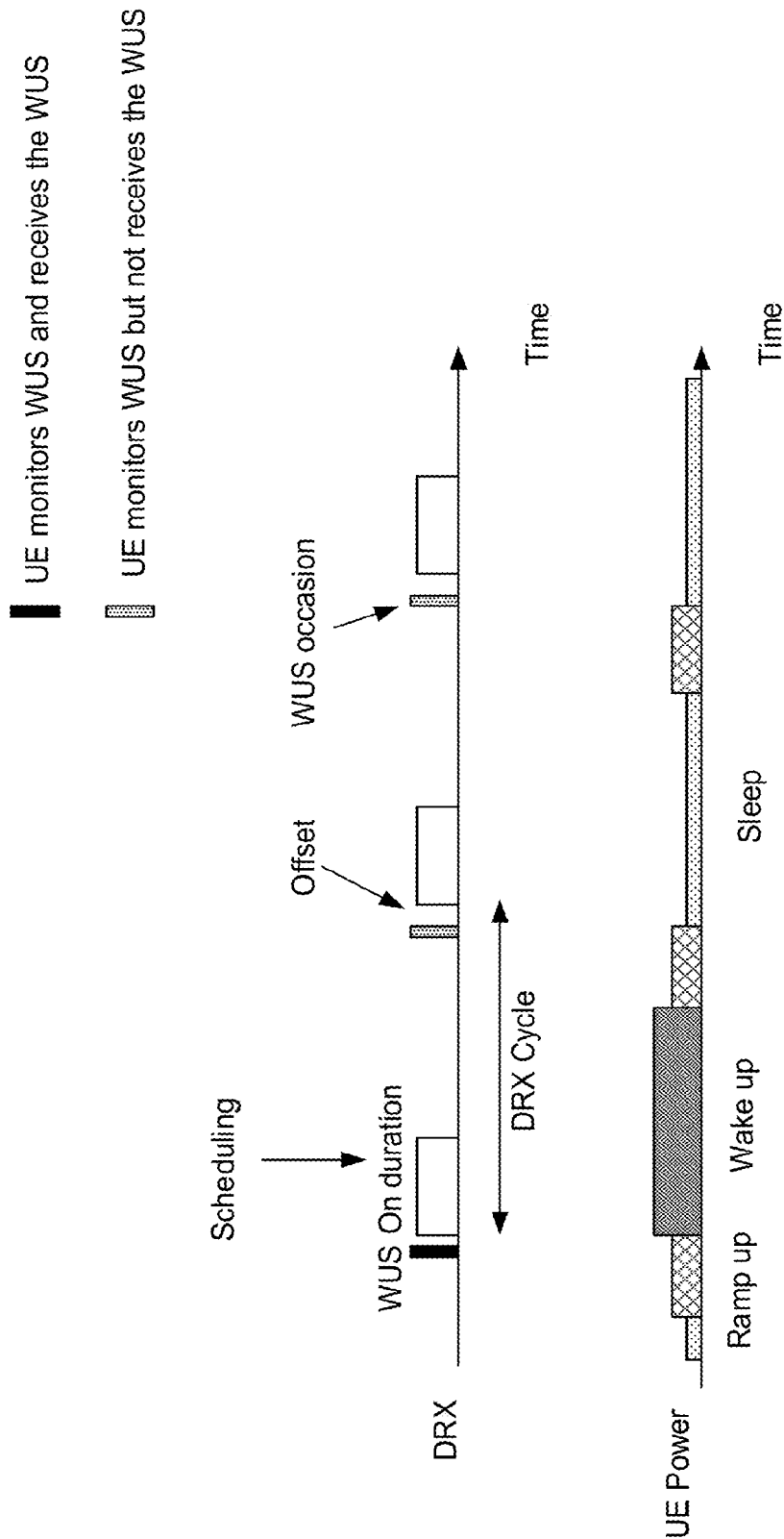
FIG. 2 is a schematic diagram illustrating a WUS mechanism, in accordance with related art methods.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For the purpose of consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the described combination, group, series and equivalents.

Additionally, any two or more than two of the following paragraphs, (sub)-bullets, points, actions, behaviors, terms, alternatives, examples, or claims described in the following disclosure may be combined logically, reasonably, and properly to form a specific method. Any sentence, paragraph, (sub)-bullet, point, action, behaviors, terms, or claims described in the following disclosure may be implemented independently and separately to form a specific method. Dependency, e.g., "based on", "more specifically", "preferably", "In one embodiment", "In one implementation", "In one alternative" or etc., in the following disclosure is just one possible example which would not restrict the specific method.

Additionally, for the purposes of explanation and non-limitation, specific details, such as functional entities, techniques, protocols, and standards are set forth for providing an understanding of the described technology. In other examples, detailed description of well-known methods, technologies, system, and architectures are omitted so as not to obscure the description with unnecessary details.

Persons skilled in the art will recognize that any described network function(s) or algorithm(s) may be implemented by hardware, software or a combination of software and hardware. Described functions may correspond to modules that are software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the disclosed implementations are directed to software installed and executing on computer hardware, alternative implementations as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc (CD) read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, an LTE-A Pro system, or an New Radio system) typically includes at least one base station (BS), at least one UE, and one or more optional network elements that provide connection with a network. The UE communicates with the network (e.g., a core network (CN), an evolved packet core (EPC) network, an Evolved Universal Terrestrial Radio Access Network (RAN) (E-UTRAN), a Next-Generation (GN) Core (NGC), 5G CN (5GC), or an internet via a RAN established by the BS.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a personal digital assistant (PDA) with wireless communication capability. The UE is configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a radio network controller (RNC) as in the UMTS, a BS controller (BSC) as in the Global System for Mobile communications (GSM)/GSM EDGE RAN (GERAN), an NG-eNB as in an E-UTRA BS in connection with the 5GC, a next gNB as in the 5G-RAN, and any other apparatus capable of controlling radio communication and managing radio resources within a cell. The BS may connect to serve the one or more UEs via a radio interface to the network.

A BS may be configured to provide communication services according to at least one of the following radio access technologies (RATs): Worldwide Interoperability for Microwave Access (WiMAX), GSM (often referred to as 2G), GERAN, General Packet Radio Service (GRPS), UMTS (often referred to as 3G) according to basic wide-band-code division multiple access (W-CDMA), high-speed packet access (HSPA), LTE, LTE-A, evolved LTE (eLTE), New Radio (NR, often referred to as 5G), and/or LTE-A Pro. However, the scope of the present disclosure should not be limited to these protocols.

The BS is operable to provide radio coverage to a specific geographical area using a plurality of cells forming the RAN. The BS supports the operations of the cells. Each cell is operable to provide services to at least one UE within radio coverage of the cell. More specifically, each cell (often referred to as a serving cell) provides services to serve one or more UEs within the cell's radio coverage, (e.g., each cell schedules the DL and optionally uplink (UL) resources to at least one UE within the cell's radio coverage for DL and optionally UL packet transmissions). The BS can communicate with one or more UEs in the radio communication system via the plurality of cells. A cell may allocate sidelink (SL) resources for supporting proximity service (ProSe). Each cell may have overlapped coverage areas with other cells.

Figure 5:
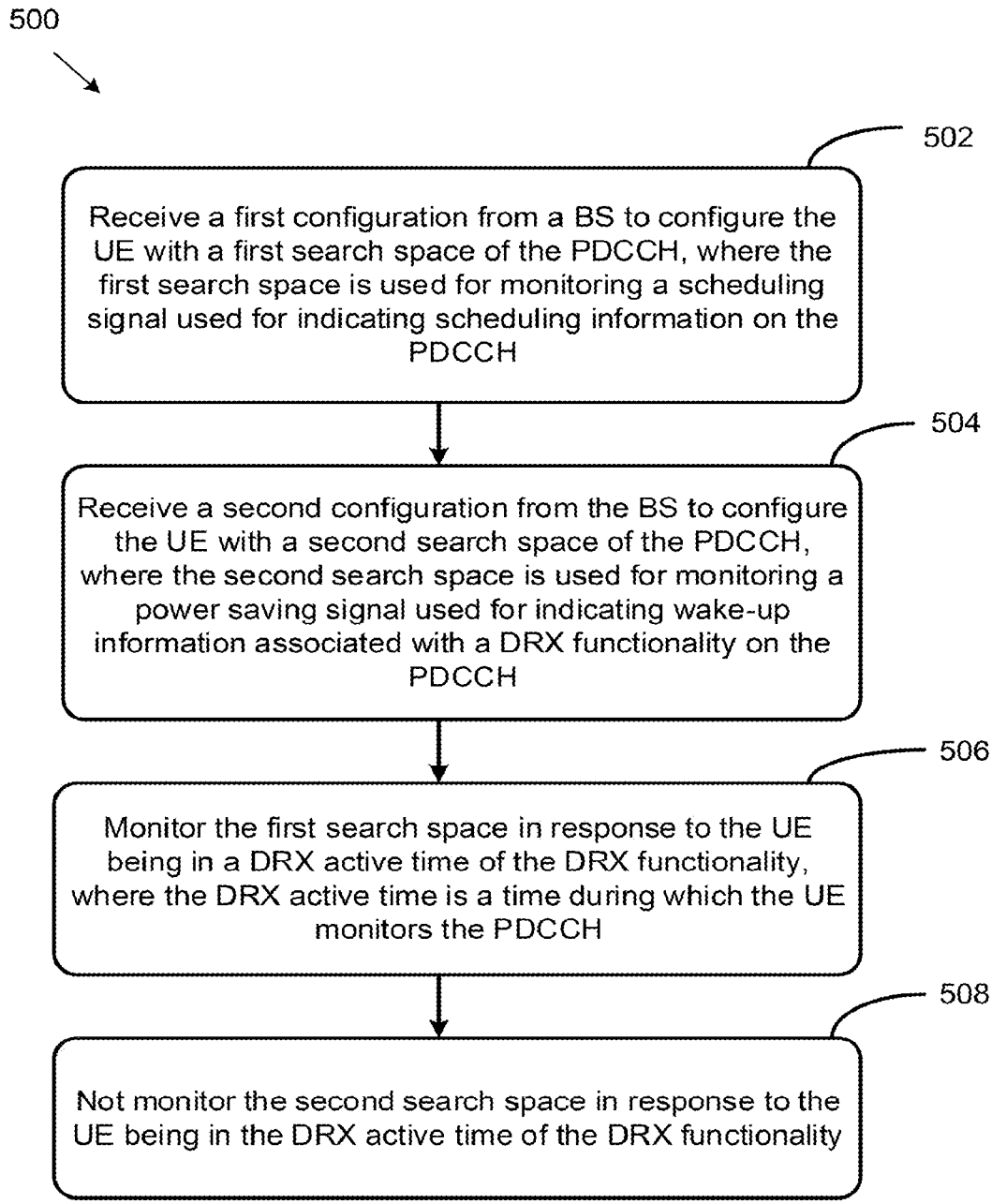
FIG. 5 is a flowchart illustrating PDCCH monitoring, in accordance with example implementations of the present disclosure.

FIG. 5 illustrates a method 500 for a UE to perform PDCCH monitoring according to the present disclosure. In action 502, the UE receives a first configuration from a BS to configure the UE with a first search space of the PDCCH, where the first search space is used for monitoring a scheduling signal used for indicating scheduling information on the PDCCH. In action 504, the UE receives a second configuration from the BS to configure the UE with a second search space of the PDCCH, where the second search space is used for monitoring a power saving signal used for indicating wake-up information associated with a Discontinuous Reception (DRX) functionality on the PDCCH. In action 506, the UE monitors the first search space in response to the UE being in a DRX active time of the DRX functionality, where the DRX active time is a time during which the UE monitors the PDCCH. In action 508, the UE does not monitor the second search space in response to the UE being in the DRX active time of the DRX functionality.

Figure 3:
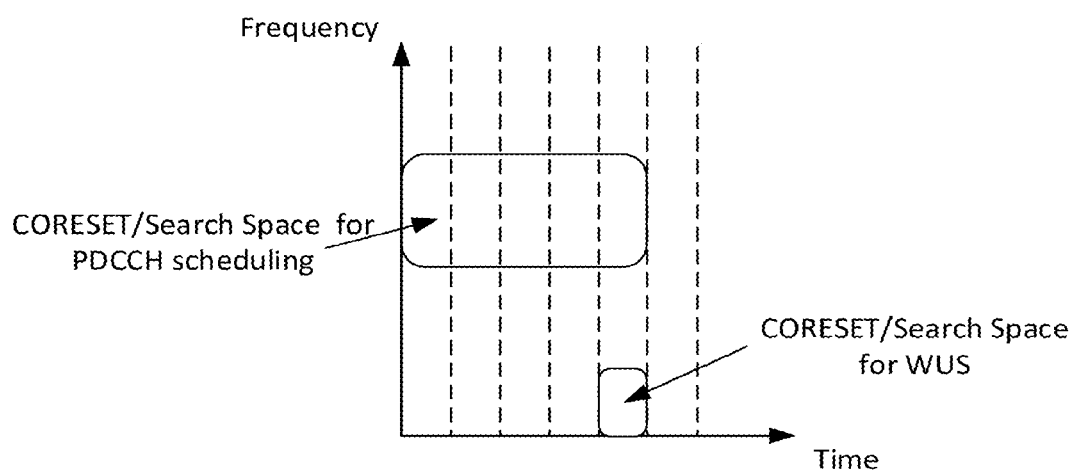
FIG. 3 is a schematic diagram illustrating a CORESET or search space for scheduling a PDCCH and a WUS, in accordance with related art methods.
Figure 4:
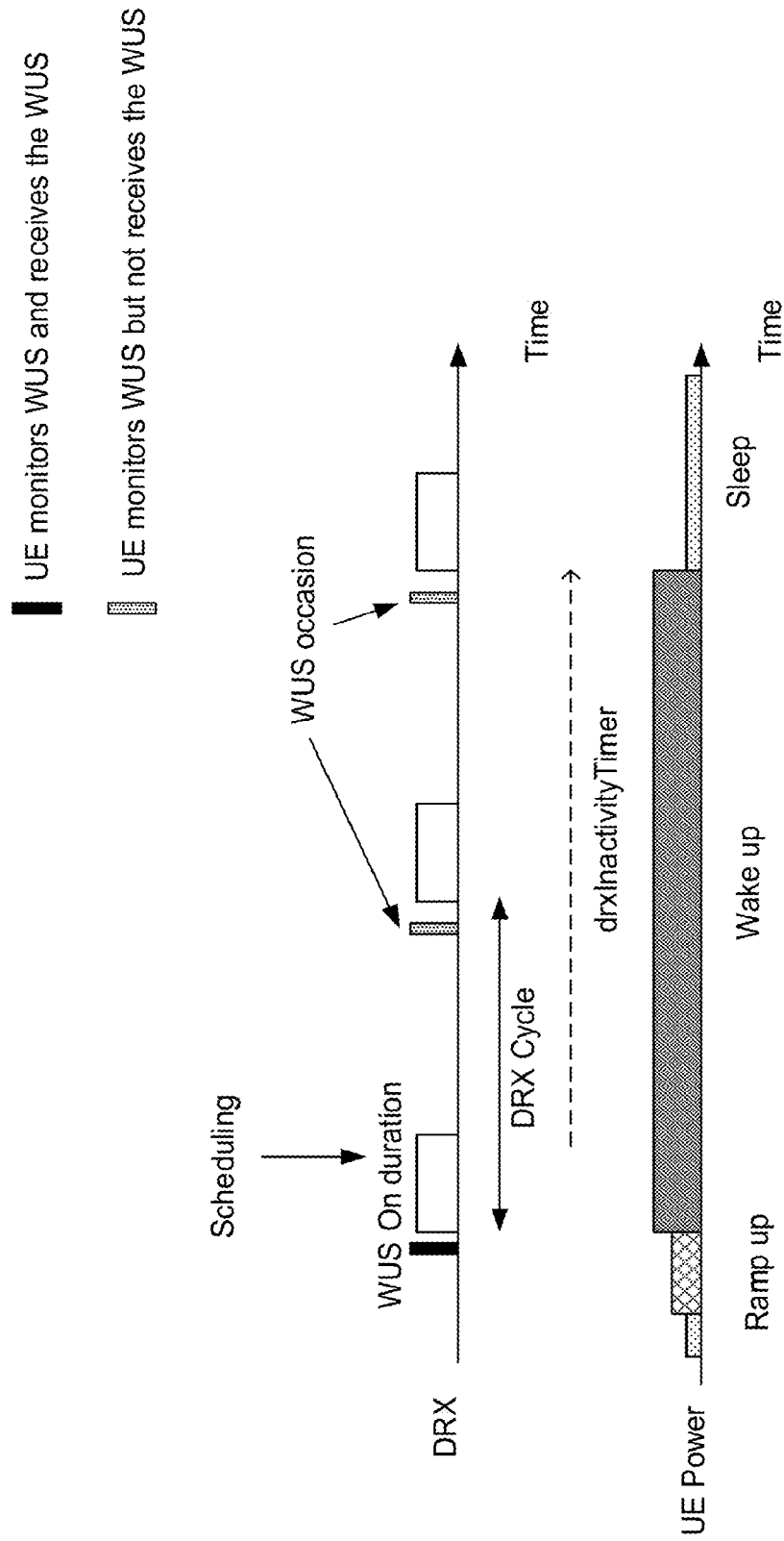
FIG. 4 is a schematic diagram illustrating the WUS within DRX active time, in accordance with related art methods.

The method 500 achieves UE power saving by not monitoring the search space for scheduling the power saving signal (e.g., WUS) during the DRX active time. Referring back to FIG. 3, if the CORESETs corresponding to the two search spaces respectively for a PDCCH monitoring occasion and a WUS monitoring occasion collide in a time domain, the UE is prohibited to monitor the WUS on the WUS occasion within the DRX active time (e.g., during drxInactivity Timer running). For example, the UE ignores monitoring the WUS on a search space configured for the WUS. Hence, the power consumption for monitoring the WUS is reduced.

The DRX active time of the UE includes the time while:
the drx-onDurationTimer, drx-Inactivity Timer, drx-RetransmissionTimerDL, drx-RetransmissionTimerUL, or ra-ContentionResolutionTimer is running: or
a Scheduling Request is sent on PUCCH and is pending: or
a PDCCH indicating a new transmission addressed to the Cell Radio Network Temporary Identifier (C-RNTI) of the Medium Access Control (MAC) entity has not been received after successful reception of a Random Access Response (RAR) for the Random Access Preamble not selected by the MAC entity among the contention-based Random Access Preamble.

More specifically, an ongoing Scheduling Request (SR) procedure may indicate that an SR is sent on the physical uplink control channel (PUCCH) and is pending.

The DRX inactive time may mean the DRX non-active time. More specifically, the UE state for only monitoring the WUS may not be called DRX active time and/or inactive time. The UE state for monitoring the WUS may be a specific state. On the other hand, the UE go-to-sleep state may indicate that the UE switches to the DRX inactive time (from DRX active time) or the UE does not monitor a normal PDCCH.

The WUS occasion may be time or frequency resource (e.g., CORESET/search space) for the UE to monitor a possible WUS transmitted from the BS. In one implementation, if the UE unsuccessfully decodes the WUS on the WUS occasion, the UE may assume that the WUS is not received. More specifically, the UE receiving the WUS may mean that the UE successfully monitors the WUS on the WUS occasion transmitted from the network node (e.g., eNB, gNB, multi-point transmission (TRP) and cell).

In one implementation, the UE may stop the drx-onDurationTimer when the UE receives the WUS on the WUS occasion (in DRX active time or in active time). The UE may stop the drx-onDurationTimer when the UE does not receive the WUS on the WUS occasion (in DRX active time or DRX inactive time). Alternatively, the UE may skip triggering drx-onDurationTimer when the UE receives the WUS on the WUS occasion (in DRX active time or inactive time).

More specifically, the UE may not start or restart the drx-onDurationTimer when the UE receives the WUS on the WUS occasion (in DRX active time or inactive time). Alternatively, the UE may stop the drx-onDurationTimer when the UE does not receive the WUS on the WUS occasion (in DRX active time or DRX inactive time).

More specifically, the UE may start or restart the drx-onDurationTimer (on a DRX cycle) when the UE does not monitor and/or receive the WUS on the WUS occasion (before the DRX cycle), or when the UE is in the DRX active time.

In one implementation, the UE may stop the drx-Inactivity Timer when the UE receives the WUS on the WUS occasion (in DRX active time). Alternatively, the UE may stop the drx-Inactivity Timer when the UE does not receive the WUS on the WUS occasion (in DRX active time or DRX inactive time).

More specifically, the UE may start or restart the drx-Inactivity Timer when the UE receives the WUS on the WUS occasion (in DRX active time or DRX inactive time). Alternatively, the UE may start or restart the drx-Inactivity Timer when the UE does not receive the WUS on the WUS occasion (in DRX active time or DRX inactive time).

More specifically, the UE may stop the drx-HARQ-RTT-TimerDL, drx-RetransmissionTimerDL, and/or ra-ContentionResolutionTimer when the UE receives the WUS on the WUS occasion (in DRX active time or DRX inactive time). Alternatively, the UE may stop the drx-HARQ-RTT-TimerDL, drx-RetransmissionTimerDL, and/or ra-ContentionResolutionTimer when the UE does not receive the WUS on the WUS occasion (in DRX active time or DRX inactive time).

For data scheduling, a network node could determine whether to schedule the UE with specific timing or not (e.g., based on buffer status of the UE, channel condition, etc.). Therefore, the network node could send a WUS (beforehand) to wake up the UE to monitor the normal PDCCH if needed. On the contrary, the network node could also decide not to send the WUS if the network node does not schedule UL or DL data transmission for the UE. By reducing unnecessary PDCCH monitoring opportunities, the UE could save significant power. More specifically, the UE power for WUS monitoring may be lower than UE power for normal PDCCH monitoring.

Figure 6:
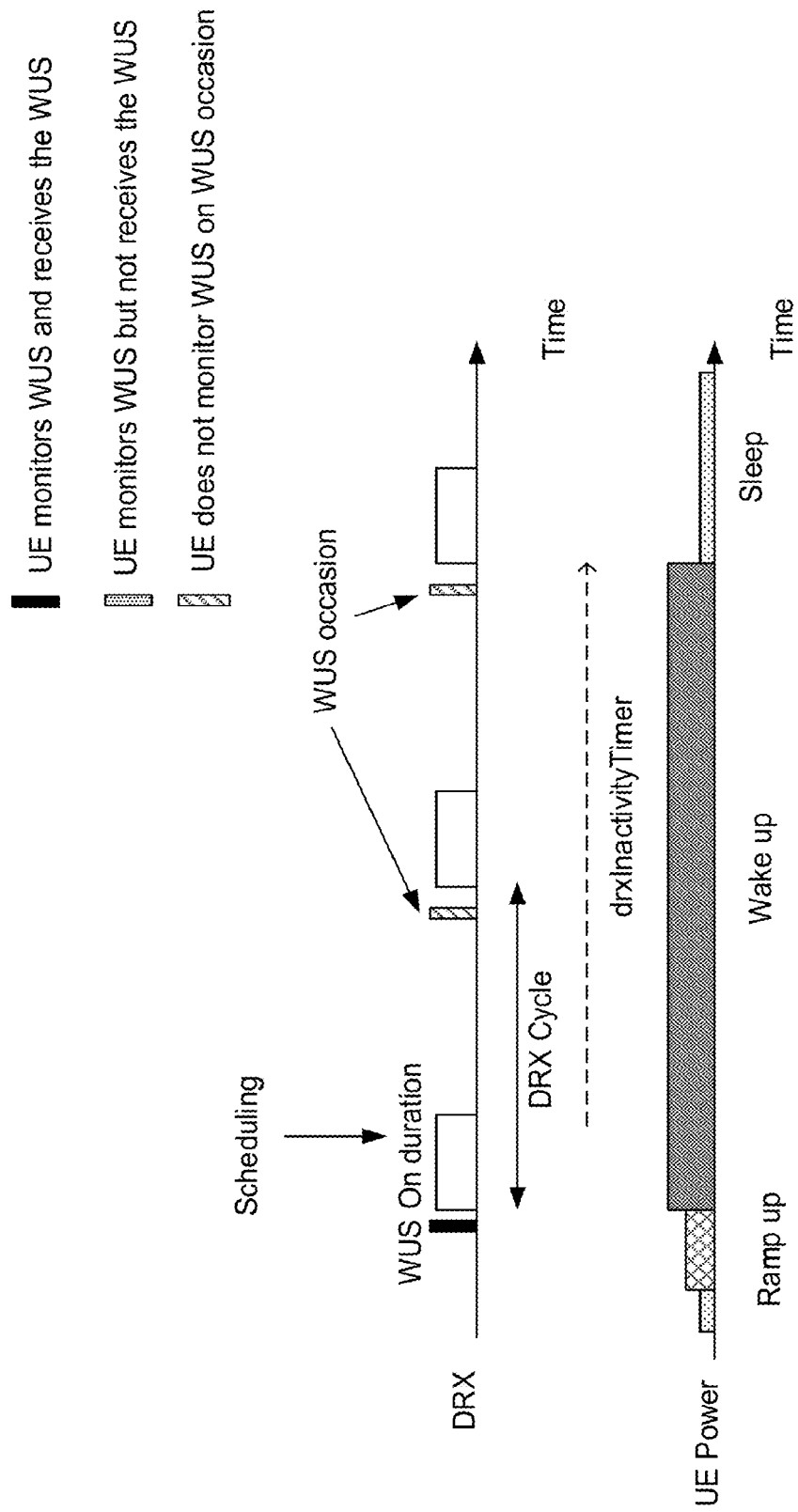
FIG. 6 is a schematic diagram illustrating WUS monitoring, in accordance with example implementations of the present disclosure.

As shown in FIG. 6, the CORESET/search space configured for the WUS and the normal PDCCH may collide in the time domain. The normal PDDCH may be utilized for scheduling UL/DL data transmission, and the normal PDDCH may be configured by a PDCCH-configuration. The UE may only monitor one of the two CORESET/search spaces at a time. For example, when the UE is in DRX active time to monitor the normal PDCCH, the UE may not monitor the WUS on the WUS occasion. In other words, the monitoring occasion (i.e., CORESETs or search spaces) of the normal PDCCH may be different from the monitoring occasion of the WUS. More specifically, the monitoring occasion of the normal PDCCH and the monitoring of WUS may be associated with the same serving cell. For example, if the UE is not in DRX active time, the UE may monitor WUS on the WUS occasion. For another example, if the UE receives the WUS on a first WUS occasion, the UE may wake up to monitor the PDCCH and start/restart a drx-Inactivity Timer when the UE receives a PDCCH for scheduling (e.g., PDCCH for UL/DL data transmission). If the drx-Inactivity Timer is running on a second WUS occasion, the UE may not monitor the WUS on the second WUS occasion (since the UE is in DRX active time). In addition, the UE may go to sleep when the drx-Inactivity Timer expires.

In other words, the purpose of the WUS may be to wake up the UE (e.g., when the UE receives the WUS), so that the UE may wake up to stay in DRX active time for monitoring the PDCCH (on next on duration time). However, if the UE is already in the DRX active time, it is unnecessary to monitor the WUS. Thus, the UE may not need to monitor the WUS when the UE is in DRX active time, so as to reduce the power consumption.

Various cases that the UE does not monitor the WUS (i.e., the UE ignores monitoring the WUS) are disclosed.

In one implementation, the UE may not monitor the WUS on the WUS occasion (or ignore monitoring the WUS on the WUS occasion) when the UE is in DRX active time (e.g., duration of drx-Inactivity Timer). On the contrary, the UE may monitor the WUS on the WUS occasion when the UE is not in DRX active time.

In one implementation, the UE may not monitor the WUS on the WUS occasion (or ignore monitoring WUS on the WUS occasion) when the UE monitors the normal PDCCH (e.g., PDCCH for DL/UL scheduling). On the contrary, the UE may monitor the WUS on the WUS occasion when the UE does not monitor the normal PDCCH at that time.

In one implementation, the UE may not monitor the WUS on the WUS occasion (or ignore monitoring WUS on the WUS occasion) and the normal PDCCH simultaneously.

In some implementations, when the UE detects a beam failure, the UE may need to monitor a specific CORESET/search space for beam failure recovery to find a candidate beam and/or to receive a beam indication (e.g., a transmission configuration indicator (TCI) state indication). In this situation, the UE may not be allowed to monitor the CORESET/search space for the WUS. The UE may stay in DRX active time to monitor the CORESET/search space for beam failure recovery until receiving the PDCCH for a beam indication (e.g., TCI state indication).

More specifically, the UE may not monitor the WUS on the WUS occasion ((or ignore monitoring WUS on the WUS occasion)) when the UE performs a beam failure recovery procedure or a random access procedure for beam failure recovery. It is noted that the UE performing the beam failure recovery procedure may mean a random access procedure for beam failure recovery is ongoing (e.g., not consider successfully complete).

In addition, the UE performing a random access procedure may mean a PDCCH indicating a new transmission addressed to the C-RNTI of the MAC entity has not been received after successful reception of an RAR for the Random Access Preamble not selected by the MAC entity among the contention-based Random Access Preamble.

The WUS may be used to trigger the indication of an RS configuration for channel tracking, a channel state information (CSI) measurement, and beam management for the additional assistance of dynamic switching of a bandwidth part (BWP) or activation of secondary cell (SCell) in achieving the power saving gain. In addition, the WUS can be used for BWP switching, activation/deactivation of an SCell or adaptation of PDCCH monitoring and/or CORESET/search space of primary cell (PCell)/SCell. More specifically, the WUS may indicate other information (e.g., cross-slot scheduling, triggering RS transmission, CSI report, single vs. multi-cell operation, BWP, SCell, MIMO layer adaptation/number of Antenna adaptation, indication of CORESET, search space or candidate of subsequent PDCCH decoding, PDCCH monitoring periodicity, PDCCH skipping (skipping duration), DRX configuration, SPS activation/deactivation). Thus, there are trade-offs on whether the UE should monitor the WUS occasion when the UE stays in DRX active time.

Figure 7:
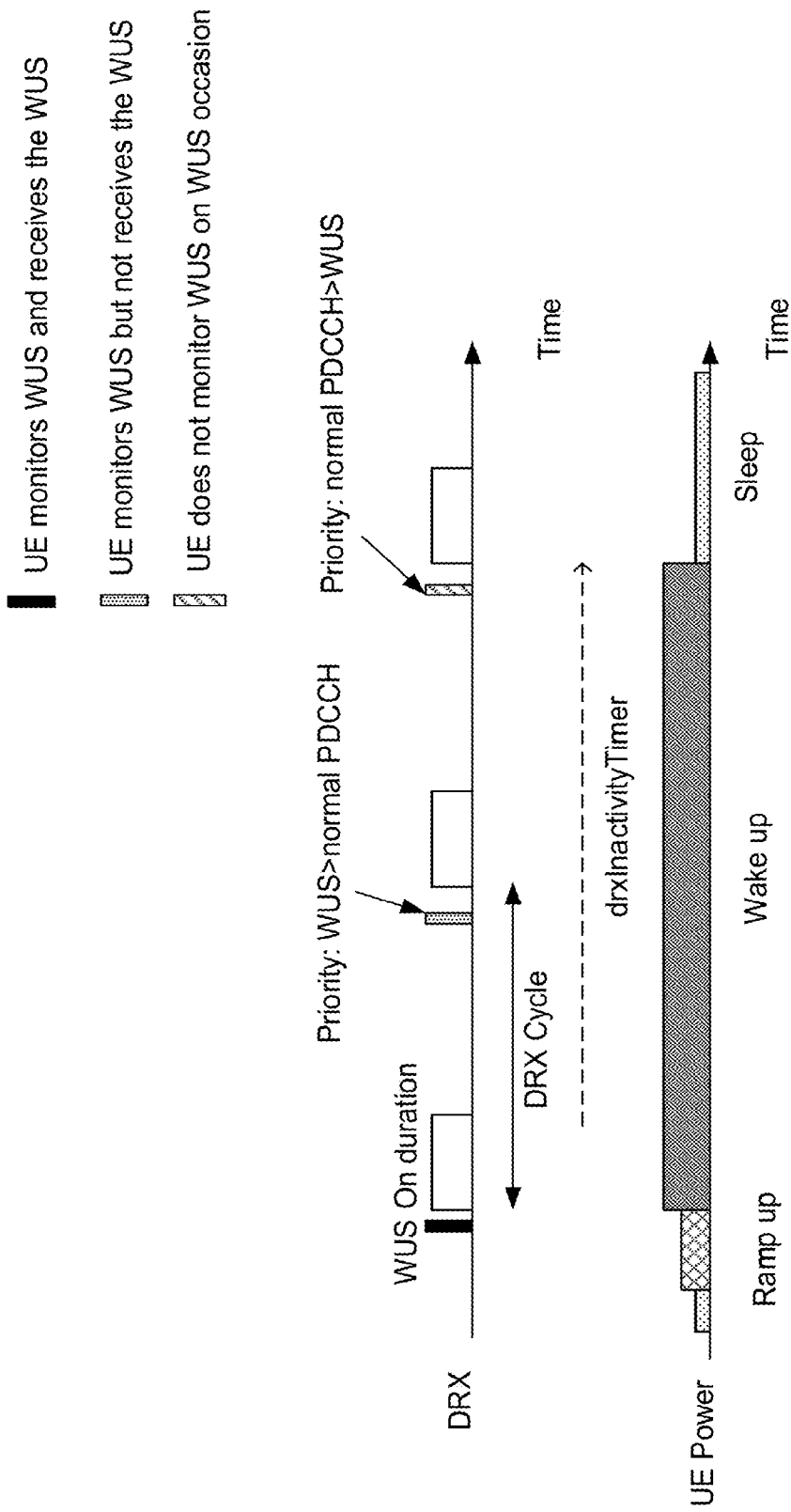
FIG. 7 is a schematic diagram illustrating WUS monitoring, in accordance with example implementations of the present disclosure.

With reference to FIG. 7, priority of monitoring the WUS and the normal PDCCH is disclosed. In order to save more power, the UE may only be allowed to monitor one of the CORESET/search space of WUS and the CORESET/search space of the normal PDCCH at a time. In other words, the UE may select one of the CORESET/search space to monitor based on a criterion. For example, if the UE monitors the CORESET/search space of the WUS, the UE does not monitor the CORESET/search space of the normal PDCCH. On the contrary, if the UE monitors the CORESET/search space of the normal PDCCH, the UE does not monitor the CORESET/search space of the WUS. Thus, the priority of monitoring the WUS and the normal PDCCH could be defined or specified in the UE (e.g., based on different scenarios).

In one implementation, the priority of WUS and the normal PDCCH may be specified in the specification.

In one implementation, the priority of WUS and the normal PDCCH may be decided by UE implementation.

Preferably, the priority of the WUS and the normal PDCCH may be configured or applied for the UE in RRC connected mode.

Preferably, the priority of monitoring the WUS and the normal PDCCH may be different in different scenarios.

In one implementation, the priority of monitoring the normal PDCCH may be higher than monitoring the WUS in one of the following scenarios:
UE is performing a random access procedure;
UE is performing a beam failure recovery procedure;
UE is performing a random access procedure for a beam failure recovery procedure;
an SR procedure is ongoing: and
an SR procedure is triggered and pending.

In the other cases, the priority of monitoring the WUS may be higher than monitoring the normal PDCCH.

As shown in FIG. 7, the left part assumes that the priority of monitoring the WUS is higher than monitoring the normal PDCCH. If the time domain of the normal PDCCH occasion and the WUS occasion collide, the UE may only monitor WUS and could not monitor the normal PDCCH (even the UE is in DRX active time). For another example as right part, assuming that the priority of monitoring the normal PDCCH is higher than monitoring WUS. If the time domain of the normal PDCCH occasion and the WUS occasion collide, the UE could only monitor the normal PDCCH, and could not monitor the WUS (on the WUS occasion).

Moreover, various WUS and/or DRX configurations are disclosed.

The WUS may be configured along with the DRX configuration as the indication for the UE to wake up from the sleep state, for triggering the UE to skip the PDCCH monitoring and to go to sleep for a period of time.

More specifically, the UE may monitor the WUS, and determine whether to go to sleep (e.g., not wake up (or not start the drx-onDurationTimer)) if the UE receives the WUS based on an indication from a network node.

More specifically, the UE may monitor the WUS, and determine whether to go to sleep (e.g., not wake up (or not start the drx-onDurationTimer)) if the UE does receive the WUS based on a network (NW) indication. In one embodiment, the UE may not go to sleep if the UE does not receive the WUS on the WUS occasion based on the NW indication. In one embodiment, the UE may stay in DRX active time (on next on duration time) if the UE does not receive the WUS on the WUS occasion based on the NW indication.

In one embodiment, the UE may stay in DRX active if the UE decodes the WUS unsuccessfully.

In one implementation, the UE may be configured with two different cycles for DRX (e.g., a long DRX cycle and a short DRX cycle). The start time and/or duration for the short DRX cycle may be configured according to the parameters "shortDRX" and/or "drx-ShortCycleTimer". The start time and/or duration for the long DRX cycle may be further configured according to the parameter "drx-LongCycleStartOffse". Since the UE may switch the DRX cycles, the WUS occasion may be different based on different DRX cycle. In other words, the UE may be configured with different configurations of the WUS for different DRX cycles. That is, the configuration of the WUS for short DRX cycle and the configuration of the WUS for long DRX cycle are different. More specifically, the configuration of the WUS may be associated with the configuration of DRX cycle, where the association may be configured by network.

In addition, the UE may use the long or short DRX cycle based on the following rule. If the UE switches from short/long DRX cycle to long/short DRX cycle, the UE may determine the WUS occasion based on different DRX cycles and/or different configuration of the WUS.

For example, if the UE uses the short DRX cycle, the UE may use a first configuration of the WUS to determine the WUS occasion. If the UE uses the long DRX cycle, the UE may use a second configuration of the WUS to determine the WUS occasion, where the first configuration of the WUS is different from the second configuration of the WUS. More specifically, the UE uses a first configuration to determine the WUS occasion; if the drx-ShortCycleTimer expires, the UE may use a second configuration to determine the WUS occasion. On the other hand, the UE uses a first configuration to determine the WUS occasion, if the UE receives a Long DRX Command MAC CE, the UE may use a second configuration to determine the WUS occasion.

In addition, the UE may apply the same behavior as receiving the DRX command when the UE receives the WUS on the WUS occasion (in DRX active time). Alternatively, the UE may apply the same behavior as receiving the DRX command when the UE does not receive the WUS on the WUS occasion (in DRX active time).

In one implementation, the WUS may be referred to as a PDCCH-based power saving signal/channel.

In one implementation, the WUS may be configured with a specific configuration for the PDCCH based power saving signal/channel.

In one implementation, the WUS may be a UE-specific or a group common signal.

In one implementation, the WUS may be transmitted via a special cell (SpCell), SCell, primary secondary cell (PSCell), or PCell. The WUS may be indicated as RRC_CONNECTED, RRC_IDLE, or RRC_INACTIVE. More specifically, the WUS may be indicated via RRC signaling, MAC signaling (e.g., MAC CE), or PHY signaling (e.g., a DL control information (DCI)).

In one implementation, the WUS may be indicated to switch DL and/or UL BWP. More specifically, the WUS may include BWP information (e.g., a BWP index).

In one implementation, the WUS may include scheduling information (e.g., the information for receiving the PDSCH reception or transmitting the PUSCH), cell information (e.g., cell index) and/or beam information (e.g., beam index).

In one implementation, the WUS may include CORESET information (e.g., CORESET index).

In one implementation, the WUS may be indicated dynamically, periodically, aperiodically, and/or semi-persistently. More specifically, the WUS may be indicated via master cell group (MCG) or secondary cell group (SCG).

Moreover, the WUS may be cross-cell indicated. More specifically, the WUS may be indicated on a specific cell and/or BWP.

In one implementation, the UE may derive the WUS occasion based a configuration (e.g., RRC configuration). Alternatively, the UE may derive the WUS occasion based on a pre-defined rule.

Note that, when the UE does not receive the WUS (on the WUS occasion), the UE may not report CSI on the PUCCH until the next WUS occasion, until the UE receives the WUS, or until the next DRX cycle. In addition, when the UE does not receive the WUS (on the WUS occasion or the DRX cycle), the UE may not transmit a sounding reference signal (SRS) until the next WUS occasion, until the UE receives the WUS, or until the next DRX cycle.

Figure 8:
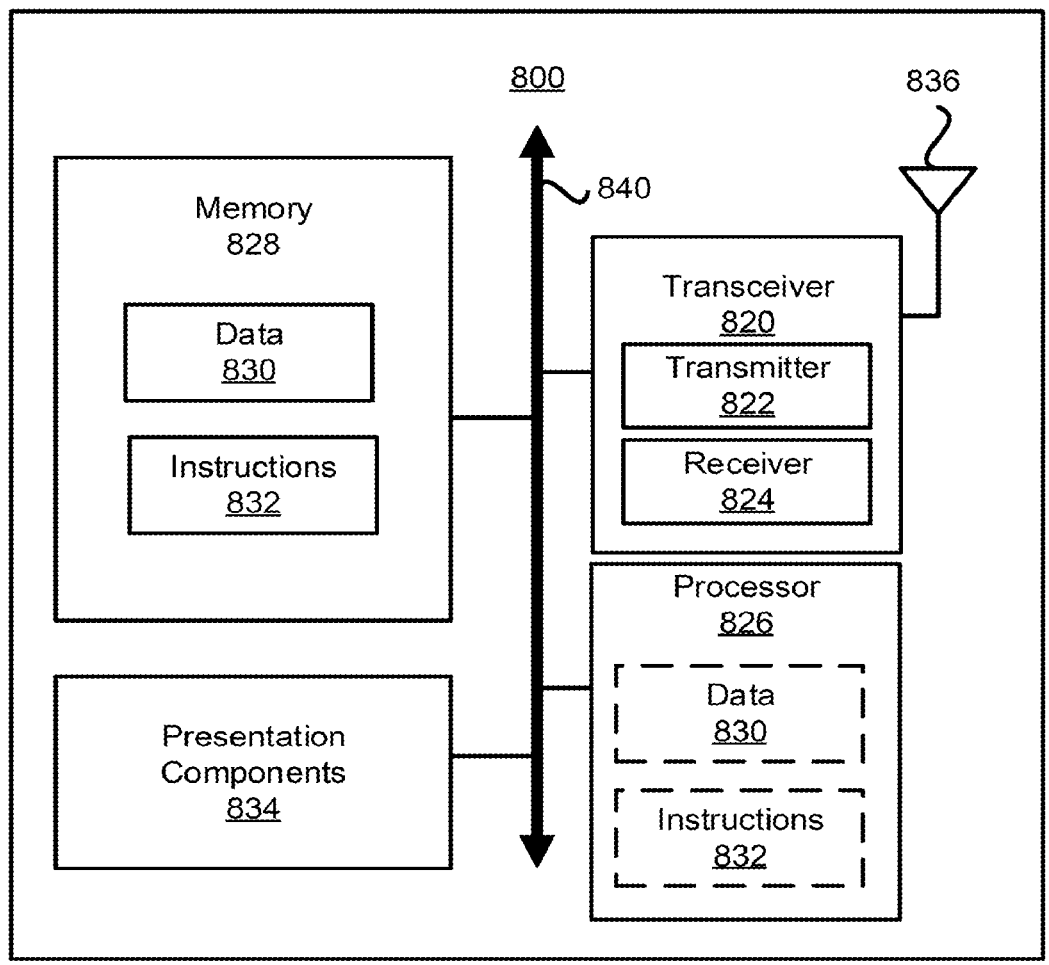
FIG. 8 is a block diagram illustrating a node for wireless communication, in accordance with example implementations of the present disclosure.

FIG. 8 illustrates a node 800 for wireless communication according to the present disclosure.

As illustrated in FIG. 8, the node 800 may include a transceiver 820, a processor 826, memory 828, one or more presentation components 834, and at least one antenna 836. The node 800 may also include an RF spectrum band module, a BS communications module, a network communications module, and a system communications management module, input/output (I/O) ports, I/O components, and a power supply (not shown). Each of these components may be in communication with each other, directly or indirectly, over one or more buses 840. The node 800 may be a UE or a BS that performs various disclosed functions as illustrated in FIG. 5.

The transceiver 820 includes a transmitter 822 (with transmitting circuitry) and a receiver 824 (with receiving circuitry) and may be configured to transmit and/or receive time and/or frequency resource partitioning information. The transceiver 820 may be configured to transmit in different types of subframes and slots including, but not limited to, usable, non-usable and flexibly usable subframes and slot formats. The transceiver 820 may be configured to receive data and control channels.

The node 800 may include a variety of computer-readable media. Computer-readable media may be any media that can be accessed by the node 800 and include both volatile and non-volatile media, removable and non-removable media. Computer-readable media may include computer storage media and communication media. Computer storage media includes both volatile and non-volatile, as well as removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes wired media such as a wired network or direct-wired connection, and wireless media such as acoustic, radio frequency (RF), infrared and other wireless media. Combinations of any of the disclosed media should be included within the scope of computer-readable media.

The memory 828 may include computer-storage media in the form of volatile and/or non-volatile memory. The memory 828 may be removable, non-removable, or a combination thereof. Memory includes solid-state memory, hard drives, and optical-disc drives. As illustrated in FIG. 8, the memory 828 may store computer-readable, computer-executable instructions 832 (e.g., software codes) that are configured to cause the processor 826 (e.g., processing circuitry) to perform various disclosed functions. Alternatively, the instructions 832 may be configured to cause the node 800 (e.g., when compiled and executed) to perform various disclosed functions.

The processor 826 may include an intelligent hardware device (e.g., a central processing unit (CPU), a microcontroller, an ASIC, etc). The processor 826 may include memory. The processor 826 may process the data 830 and the instructions 832 received from the memory 828, and information received via the transceiver 820, the base band communications module, and/or the network communications module. The processor 826 may also process information to be sent to the transceiver 820 for transmission via the antenna 836, to the network communications module for transmission to a CN.

One or more presentation components 834 present data to a person or other device. Presentation components 834 include a display device, speaker, printing component, and vibrating component.

From the previous disclosure, it is evident that various techniques can be utilized for implementing the concepts of the present disclosure without departing from the scope of those concepts. Moreover, while the concepts have been described with specific reference to certain implementations, a person of ordinary skill in the art would recognize that changes can be made in form and detail without departing from the scope of those concepts. As such, the disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a user equipment (UE) monitoring a physical downlink control channel (PDCCH), the method comprising:
   receiving a first configuration from a base station to configure the UE with a first search space of the PDCCH, wherein the first search space is used for monitoring a scheduling signal used for indicating scheduling information;
   receiving a second configuration from the base station to configure the UE with a second search space of the PDCCH, wherein the second search space is used for monitoring a power saving signal used for indicating wake-up information associated with a Discontinuous Reception (DRX) functionality;
   monitoring the first search space according to the first configuration in response to the UE being in a DRX active time of the DRX functionality, wherein the DRX active time is a time during which the UE monitors the PDCCH for the scheduling information;
   monitoring the second search space according to the second configuration in response to the UE being in a DRX inactive time of the DRX functionality;
   not monitoring the second search space in response to the UE being in the DRX active time of the DRX functionality; and
   in response to not receiving the power saving signal while monitoring the second search space, starting a DRX on-duration timer of the DRX functionality.

2. The method of claim 1, wherein the first search space includes at least one of a first time and a first frequency resource for the UE to monitor the scheduling signal, and the second search space includes at least one of a second time and a second frequency resource for the UE to monitor the power saving signal.

3. The method of claim 1, further comprising:
   determining whether to start the DRX on-duration timer of the DRX functionality according to the wake-up information.

4. The method of claim 1, wherein the power saving signal is further used for indicating a bandwidth part switch of a cell.

5. The method of claim 1, wherein the power saving signal is not received in the second search space in response to when the UE does not monitor the second search space or the UE unsuccessfully decodes the power saving signal.

6. The method of claim 1, wherein the not monitoring the second search space comprises: not monitoring the second search space while a DRX inactivity timer of the DRX functionality is running.

7. The method of claim 1, further comprising:
   not monitoring the second search space in response to the UE performing a random access procedure, wherein the UE performs the random access procedure in response to one of:
   a random access response window is running after transmitting a first random access preamble; and
   the UE has not received the scheduling signal on the PDCCH indicating a new transmission addressed to a Cell Radio Network Temporary Identifier (C-RNTI) of the UE after successful reception of a random access response corresponding to a second random access preamble not selected by the UE among contention-based random access preambles.

8. The method of claim 1, further comprising:
   not monitoring the second search space in response to at least one of the UE performing a beam failure recovery procedure and the UE monitoring a third search space on the PDCCH, wherein the third search space is configured for the UE to monitor a beam failure response from the base station.

9. The method of claim 1, wherein the power saving signal is only received from a special cell (SpCell) of the base station.

10. A user equipment (UE) monitoring a physical downlink (DL) control channel (PDCCH) in a wireless communication system, the UE comprising:
    a transceiver;
    a processor, for executing computer-executable instructions; and
    a non-transitory machine-readable medium, coupled to the processor, for storing the computer-executable instructions, wherein the computer-executable instructions instruct the processor to:
    receive, via the transceiver, a first configuration from a base station to configure the UE with a first search space of the PDCCH, wherein the first search space is used for monitoring a scheduling signal used for indicating scheduling information;
    receive, via the transceiver, a second configuration from the base station to configure the UE with a second search space of the PDCCH, wherein the second search space is used for monitoring a power saving signal used for indicating wake-up information associated with a Discontinuous Reception (DRX) functionality;
monitor, via the transceiver, the first search space according to the first configuration in response to the UE being in a DRX active time of the DRX functionality, wherein the DRX active time is a time during which the UE monitors the PDCCH for the scheduling information;
monitor, via the transceiver, the second search space according to the second configuration in response to the UE being in a DRX inactive time of the DRX functionality;
not monitor, via the transceiver, the second search space in response to the UE being in the DRX active time of the DRX functionality; and
in response to not receiving the power saving signal while monitoring the second search space, start a DRX on-duration timer of the DRX functionality.

11. The UE of claim 10, wherein the first search space includes at least one of a first time and a first frequency resource for the UE to monitor the scheduling signal, and the second search space includes at least one of a second time and a second frequency resource for the UE to monitor the power saving signal.

12. The UE of claim 10, wherein the computer-executable instructions further instruct the processor to:
determine whether to start the DRX on-duration timer of the DRX functionality according to the wake-up information.

13. The UE of claim 10, wherein the power saving signal is further used for indicating a bandwidth part switch of a cell.

14. The UE of claim 10, wherein the computer-executable instructions further instruct the processor to:
not receive, via the transceiver, the power saving signal in the second search space in response to when the UE does not monitor the second search space or the UE unsuccessfully decodes the power saving signal.

15. The UE of claim 10, wherein the computer-executable instructions further instruct the processor to:
not monitor, via the transceiver, the second search space while a DRX inactivity timer of the DRX functionality is running.

16. The UE of claim 10, wherein the computer-executable instructions further instruct the processor to:
not monitoring, via the transceiver, the second search space in response to the UE performing a random access procedure, wherein the UE performs the random access procedure in response to one of:
a random access response window is running after transmitting a first random access preamble; and
the UE has not received the scheduling signal on the PDCCH indicating a new transmission addressed to a Cell Radio Network Temporary Identifier (C-RNTI) of the UE after successful reception of a random access response corresponding to a second random access preamble not selected by the UE among contention-based random access preambles.

17. The UE of claim 10, wherein the computer-executable instructions further instruct the processor to:
not monitor, via the transceiver, the second search space in response to at least one of the UE performing a beam failure recovery procedure and the UE monitoring a third search space of the PDCCH, wherein the third search space is configured for the UE to monitor a beam failure response from the base station.

18. The UE of claim 10, wherein the power saving signal is only received from a special cell (SpCell) of the base station.

* * * * *